(12) United States Patent
Richards et al.

(10) Patent No.: US 7,590,515 B2
(45) Date of Patent: Sep. 15, 2009

(54) METHOD AND APPARATUS FOR TREATING MOVING BOUNDARIES IN MULTI-CELL COMPUTER MODELS OF FLUID DYNAMIC SYSTEMS

(75) Inventors: Keith Jared Richards, Mount Horeb, WI (US); Meizhong Dai, Madison, WI (US); Eric Douglas Pomraning, Madison, WI (US); Peter Kelly Senecal, Middleton, WI (US); Tianliang Yang, Madison, WI (US)

(73) Assignees: Convergent Thinking, LLC, Madison, WI (US); Caterpillar Inc., Peoria, IL (US)

( * ) Notice: Subject to any disclaimer, the term of this patent is extended or adjusted under 35 U.S.C. 154(b) by 611 days.

(21) Appl. No.: 11/318,633

(22) Filed: Dec. 28, 2005

(65) Prior Publication Data

US 2007/0162267 A1    Jul. 12, 2007

(51) Int. Cl.
*G06G 7/50* (2006.01)
(52) U.S. Cl. ............................................... 703/9
(58) Field of Classification Search .................... 703/9, 703/2
See application file for complete search history.

(56) References Cited

U.S. PATENT DOCUMENTS

| | | | |
|---|---|---|---|
| 5,877,777 | A | 3/1999 | Colwell |
| 7,024,342 | B1 * | 4/2006 | Waite et al. .................. 703/6 |
| 2004/0167757 | A1 | 8/2004 | Struijs |
| 2005/0128195 | A1 | 6/2005 | Houston et al. |
| 2005/0182603 | A1 | 8/2005 | Freitas et al. |
| 2005/0246110 | A1 | 11/2005 | van Dam et al. |
| 2005/0253854 | A1 * | 11/2005 | Lischinski et al. .......... 345/474 |
| 2006/0015306 | A1 * | 1/2006 | Chow .......................... 703/2 |

(Continued)

FOREIGN PATENT DOCUMENTS

| | | |
|---|---|---|
| EP | 1229463 | 8/2002 |
| WO | WO 2004/061723 | 7/2004 |

OTHER PUBLICATIONS

Verzico, Roberto, "Large Eddy Simulation in Complex Geometric Configurations Using Boundary Body Forces," AIAA Journal, Mar. 2000, pp. 427-433, vol. 38, USA.

(Continued)

*Primary Examiner*—Paul L Rodriguez
*Assistant Examiner*—Juan C Ochoa
(74) *Attorney, Agent, or Firm*—Finnegan, Henderson, Farabow, Garrett & Dunner

(57) ABSTRACT

Method for treating a moving surface during a transient condition in a computational fluid dynamics system multi-cell computer model, the model having a fixed underlying geometric grid, includes identifying cells in the grid adjacent the moving surface at the beginning of a transient time step and identifying beginning adjacent cell boundaries formed in the grid by the moving surface. The method also includes computing effective thermophysical value fluxes through the beginning cell boundaries in accordance with the sense of the movement of the moving surface relative to the beginning adjacent cells. The method further includes solving transport equations for all the cells to determine cell thermophysical values at the end of the time step, using the computed effective fluxes and reforming the grid to comply with the moving surface at the end of the time step. Apparatus includes a digital computer programmed to carry out the above method.

20 Claims, 4 Drawing Sheets

U.S. PATENT DOCUMENTS

| | | | |
|---|---|---|---|
| 2006/0089803 A1* | 4/2006 | Lei et al. ............... 702/1 |
| 2006/0271297 A1 | 11/2006 | Repelli et al. |
| 2006/0271888 A1 | 11/2006 | Meuris et al. |
| 2007/0038423 A1 | 2/2007 | Froning et al. |

OTHER PUBLICATIONS

Fadlun, E.A. et al., "Combined Immersed-Boundary Finite-Difference Methods For Three-Dimensional Complex Flow Simulations," Journal of Computation Physics, Jun. 10, 2000, pp. 35-60, vol. 161, USA.

Peskin, Charles S., "Flow Patterns Around Heart Valves: A Numerical Method," Journal of Computational Physics, Oct. 10, 1972, pp. 252-271, vol. 10, USA.

Berger et al., "Aspects (and Aspect Ratios) of Cartesian Mesh Methods," Proceedings of the 16$^{th}$ International Conference on Numerical Methods in Fluid Dynamics, to appear in "Lecture Notes in Physics," Jul. 6-10, 1998, pp. 1-12, Arcachon, France.

Charlton, Eric Frederick, "An Octree Solution to Conservation-laws over Arbitrary Regions (OSCAR) with Applications to Aircraft Aerodynamics," Aerospace Engineering and Scientific Computing in The University of Michigan (dissertation), 1997, pp. 1-220, USA.

Richards et al., "On the Use of the Immersed Boundary Method for Engine Modeling," International Multidimensional Engine Modeling Users Group (Meeting), pp. 1-6, Mar. 2003.

John P. Morrison et al., An Investigation into Applicability of Distributed FPGAs to High-Performance Computing 277-294 (1994) Department of Computer Science, St. Francis Xavier University, Antigonish, Nova Scotia, Canada; Department of Computer Software, University of Aziu-Wakamatsu-Shi, Japan.

Monorchio et al., A Novel Subgridding Scheme Based on a Combination of the Finite Element and Finite-Difference Time-Domain Methods, IEEE Transactions on Antennas and Propagation, vol. 46, No. 9, Sep. 1998.

* cited by examiner

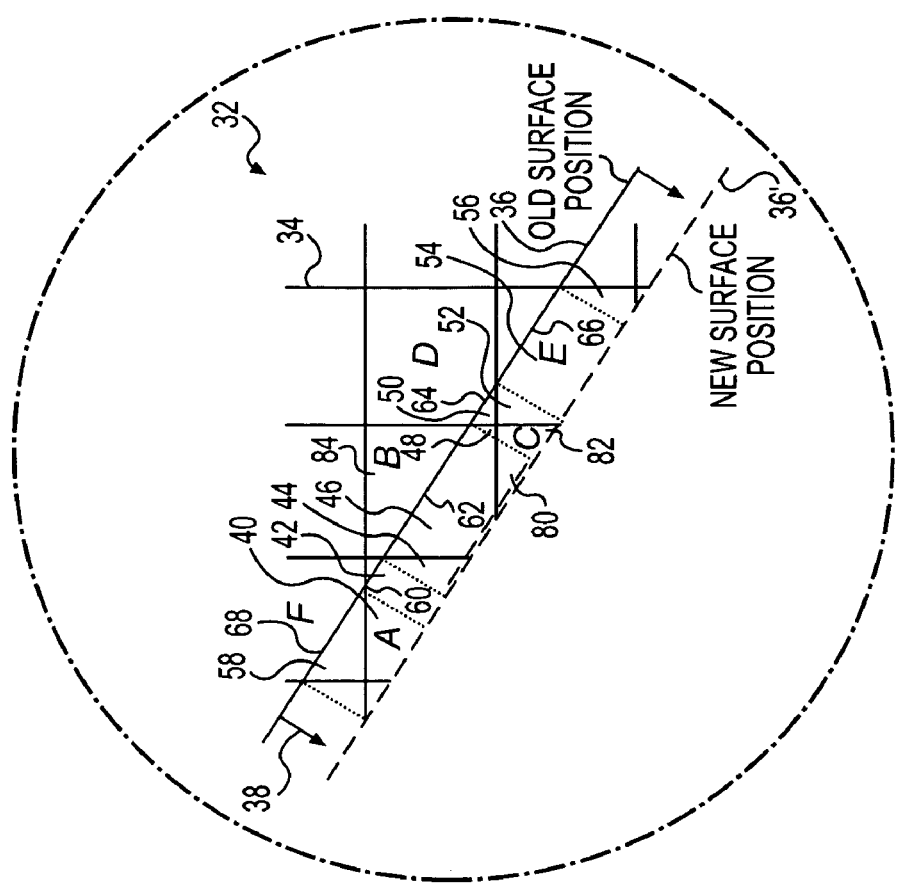
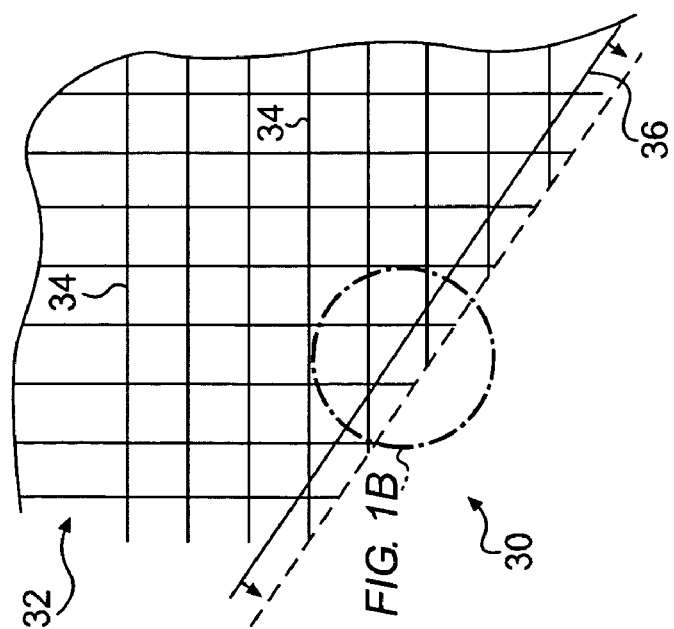
FIG. 1B
FIG. 1A

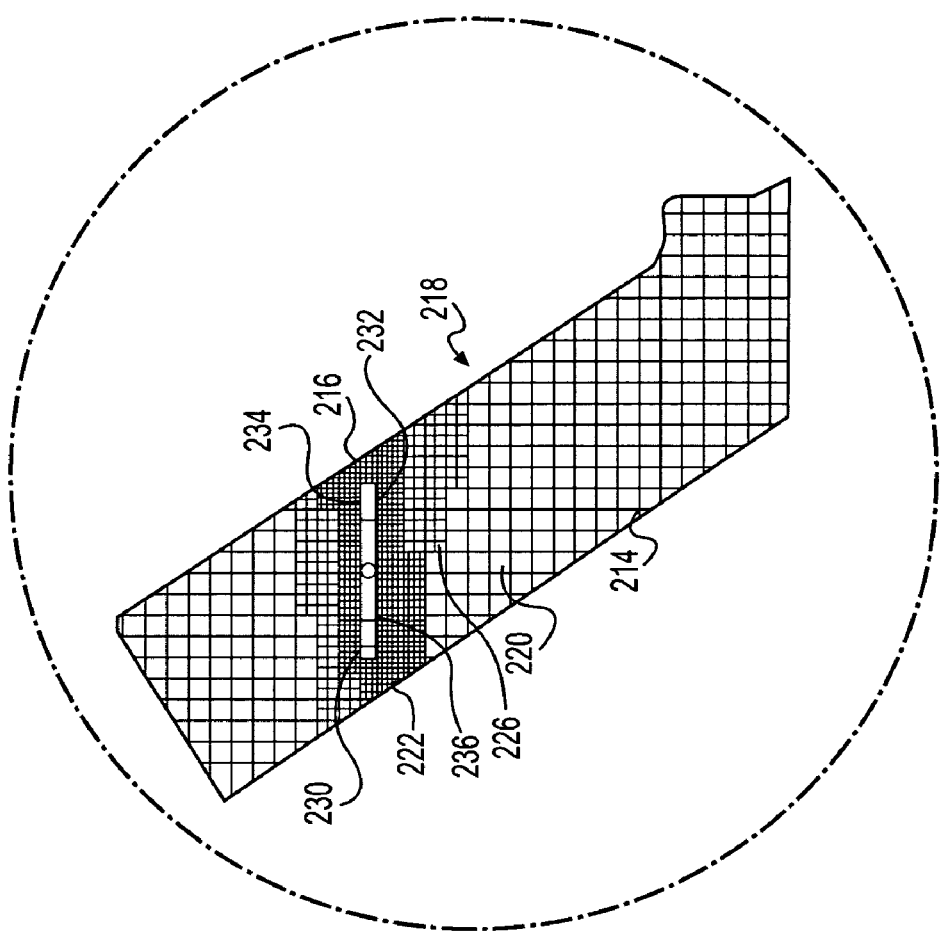
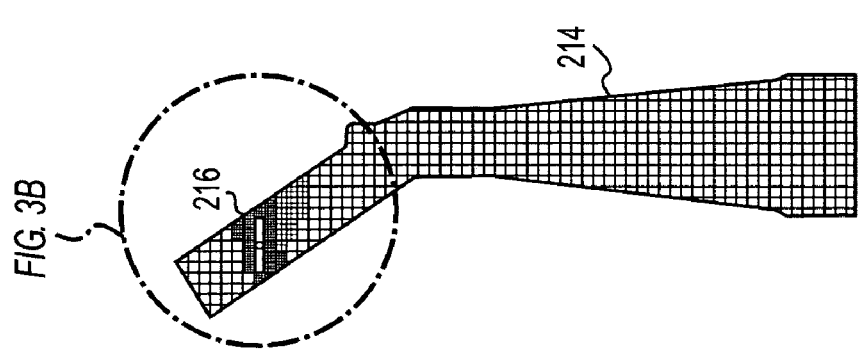

METHOD AND APPARATUS FOR TREATING MOVING BOUNDARIES IN MULTI-CELL COMPUTER MODELS OF FLUID DYNAMIC SYSTEMS

TECHNICAL FIELD

The present disclosure relates generally to a method and apparatus for computer modeling fluid dynamic systems. More particularly, the present disclosure relates to a method for treating moving boundaries in multi-cell computer models of fluid dynamic systems, and apparatus for performing the method.

BACKGROUND

Modeling dynamic systems, including fluid dynamic systems, using computers, particularly high-speed digital computers, is a well known and cost efficient way of predicting system performance for both steady state and transient conditions without having to physically construct and test an actual system. A benefit to computer modeling is that the effect on performance of changes in system structure and composition can be easily assessed, thereby leading to optimization of the system design prior to construction of a commercial prototype.

Known modeling programs generally use a "multi-cell" approach, where the structure to be modeled is divided into a plurality of discrete volume units (cells). Typically, the computer is used to compute thermophysical values of the fraction of the system within the cell, such as, e.g., mass, momentum, and energy values, as well as associated fluid system design parameters such as density, pressure, velocity, and temperature, by solving the conservation equations governing the transport of state value units to or from the neighboring cells. For a fixed geometric system model using Cartesian coordinates, and absent a system boundary, each cell would have six cell neighbors positioned adjacent the six faces of the cube-shaped cell. An example of a computational fluid dynamics ("CFD") modeling program is the MoSES Program (available from Convergent Thinking LLC, Madison, Wis.).

There are two types of boundary fitted grids. The more conventional type of boundary fitted grid morphs the cells near the boundary to conform to the shape of the geometry, e.g., a six-sided cell near a boundary would not necessarily be a perfect cube. The other method is commonly called a "cut-cell" method. In a typical boundary fitted grid, moving surfaces are handled by further morphing the near wall cells. For "cut-cell" methods, the underlying cells do not move with the boundary; instead, the boundary motion simply results in a new series of cuts to the underlying grid. The method described here offers a way to properly transport thermophysical properties during the moving process for a "cut-cell" grid.

SUMMARY OF THE INVENTION

In one aspect, as embodied and broadly described herein, a method for treating a moving surface during a transient condition in a computational fluid dynamics system multi-cell computer model, the model having a fixed underlying geometric grid includes identifying cells in the grid adjacent the moving surface at the beginning of a transient time step, and identifying beginning adjacent cell boundaries formed in the grid by the moving surface. The method also includes computing effective thermophysical value fluxes through the beginning cell boundaries in accordance with the sense of the movement of the moving surface relative to the beginning adjacent cells. The method further includes solving transport equations for all the cells in at least the portion of the grid including the beginning adjacent cells to determine cell thermophysical values at the end of the time step, using the computed effective fluxes. And, the method still further includes reforming the grid to comply with the moving surface at the end of the time step.

Further, in another aspect, as embodied and broadly described herein, an apparatus for implementing a multi-cell computational fluid dynamics model having a moving surface during a transient condition includes a digital computer, and a program loaded in the computer for running the multi-cell computational fluid dynamics model, the model including a fixed underlying geometric grid for defining the cells. The program includes software for identifying cells in the grid adjacent the moving surface at the beginning of a transient time step and identifying beginning adjacent cell boundaries formed in the grid by the moving surface. The program also includes software for computing effective thermophysical value fluxes through the beginning cell boundaries in accordance with the sense of the movement of the moving surface relative to the beginning adjacent cells. The program further includes software for solving transport equations for all the cells in at least the portion of the grid including the beginning adjacent cells to determine cell thermophysical values at the end of the time step, using the computed effective fluxes. And the program still further includes software for reforming the grid to comply with the moving surface at the end of the time step.

BRIEF DESCRIPTION OF THE DRAWINGS

FIG. 1A is a schematic illustration of an exemplary boundary surface of a fluid dynamic system model moving in an "expansion" sense in relation to the fixed geometric model grid, to be treated by a method in accordance with the present invention;

FIG. 1B is a detail of the illustration of FIG. 1A;

FIG. 3A is a schematic illustration of an exemplary internal combustion engine intake pipe having a moving throttle plate, with an overlaid fixed underlying geometric grid model, to be treated in accordance with the method of the present invention;

FIG. 3B is a detail of the illustration of FIG. 3A; and

DETAILED DESCRIPTION

Figure 2B:
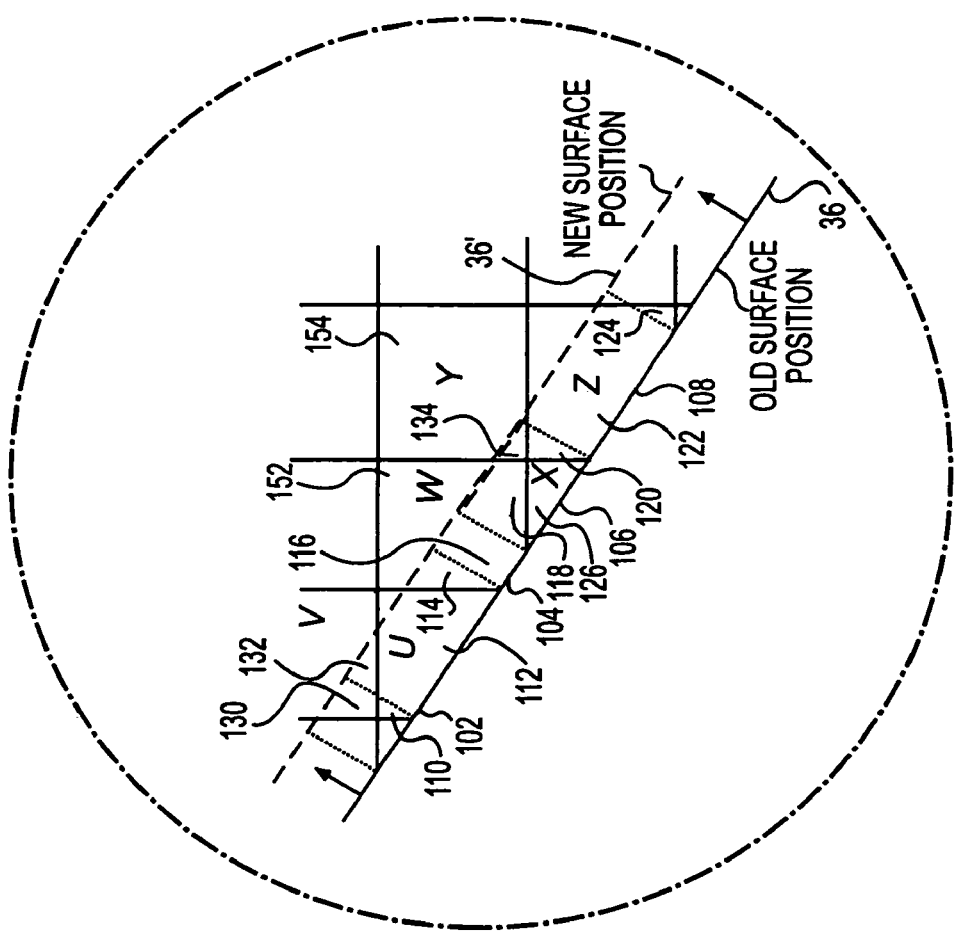
FIG. 2B is a detail of the illustration of FIG. 2A.

A modified cut-cell approach is disclosed herein that uses a unique method for handling moving surfaces. According to the modified cut-cell approach disclosed and discussed herein, the moving surface is treated as an inflow or an outflow boundary for the cells adjacent the surface in the grid existing at the beginning of a time step, depending on the direction of motion. After the new grid is formed at the end of the time step, the new portion of the grid, created by the swept volume of the surface moving in an "expansion" sense relative to the adjacent model cells, is given the thermophysical values that were convected out of the cell through the boundary. For the case where the surface moves in a "compression"

sense, thermophysical values of the cell portions "swept" by the moving surface are deleted. This results in conservation of transported quantities across the moving boundaries.

As described herein, a method for treating a moving surface during a transient condition in a fluid dynamics system multi-cell computer model having a fixed underlying geometric grid includes identifying cells in the grid adjacent the moving surface at the beginning of a transient time step. As embodied herein, and with initial reference to FIGS. 1A and 1B, the multi-cell model 30 includes fixed Cartesian three-dimensional ("3D") geometric grid 32. The individual cells 34 of grid 32 are cubic in shape except at the grid boundaries, such as the moving boundary surface 36, where partial, "cut" cells can occur. In FIGS. 1A and 1B, surface 36 is moving away from the existing cells 34 of grid 32 at the beginning of a transient time step; that is, surface 36 is moving in an "expansion" sense.

As best seen in the detail of FIG. 1B, at the beginning of a transient time step $\Delta \tau$, the position of moving surface 36 is such that grid 32 cells A, B, D, E, and F are partial cells each having a boundary determined by moving surface 36. Hence, cells A, B, D, E, and F (but not C) would be cells identified as "beginning adjacent cells" for the purpose of the method disclosed herein. Also, respective cell boundaries 60, 62, 64, 66, and 68 shown in FIG. 1B would be considered "beginning cell boundaries." One skilled in the art would understand that in a 3D grid, other cells (not shown) would qualify as "beginning adjacent cells" and have respective "beginning cell boundaries" (also not shown) in respect to the moving surface 36.

Further, the method includes computing effective thermophysical value fluxes through the beginning cell boundaries in accordance with the sense of the movement of the moving surface relative to the beginning adjacent cells. As mentioned previously, the thermophysical values of interest include, but are not limited to, mass, momentum, and energy values, which can be in the form of corresponding pressure, velocity, temperature, etc., values typically used in fluid dynamics calculations.

As embodied herein, and with continued reference to FIGS. 1A and 1B that depict model 30 having moving surface 36 moving in an expansion sense, fluxes are assumed to flow out of beginning adjacent cells A, B, D, E, and F through respective beginning boundaries 60, 62, 64, 66, and 68 because of the "expansion" movement of surface 36 away from these cells. Computation of effective thermophysical values for the model shown in FIGS. 1A and 1B may include setting a flux velocity based on the velocity of 36 such as, for the example in FIGS. 1A and 1B, in the direction of motion 38 of surface 36.

The computation also may include determining volumes swept by the respective beginning boundaries projected to the position 36' of moving surface at the end of the time step. For example, in the "expansion" case depicted in FIGS. 1A and 1B, beginning adjacent cell boundaries 60, 62, 64, 66, and 68 of cells A, B, D, E, and F, respectively, are projected along direction of motion 38 to new position 36'. In FIGS. 1A and 1B, these projections define swept volumes shown (in 2D) by dotted lines.

The computation step also may include selecting thermophysical values for the respective swept volumes, for combining with the set flux velocity. For the expansion case, the thermophysical values fluxing through the beginning boundaries into the swept volumes are assumed to be the values of the respective beginning adjacent cells. That is, in the example in FIGS. 1A and 1B, the selected thermophysical values for the volume swept by beginning boundary 62 of cell B, would be the values for beginning adjacent cell B. Similarly, the selected values for the volume swept by beginning boundary 64 of beginning adjacent cell D, would be the values for beginning adjacent cell D.

Still further, the disclosed method includes solving transport equations for all the cells in at least a portion of the grid that includes the beginning adjacent cells to determine cell thermophysical values at the end of the time step. In the solving step, the computed effective thermophysical value fluxes are used. For example, in FIG. 1B, the equations governing flux transport would be solved for cells in the beginning grid 32 between beginning cell B (i.e., volume portion 84) and each of its neighboring cells in the 3D grid, such as cells A and D, and including the previously computed effective flux through beginning boundary 62. The solutions of these equations would yield new thermophysical values for cell B (volume portion 84), as well as the neighbor cells, reflecting conditions at the end of the time step.

It may be preferred to perform successive iterations of the computing and solving steps until a preselected convergence criterion is met, such as the change in the solved-for thermophysical values for the cells in successive iterations being less than a preselected amount or percentage. In such successive iterations, the thermophysical values from the previous iteration, that is, the most current values, may be used for the cells as well as for the computed effective fluxes through the respective beginning boundaries. Also, the solving step may be done for all the cells in the grid, rather than just cells in the general area of the moving surface.

Further, the method includes reforming the model grid to comply with the moving surface at the end of the transient time step. As embodied herein, and with continued reference to the "expansion" case depicted in FIGS. 1A and 1B, the new position 36' of the moving surface 36 requires the addition to the previous grid 32 of new portions of the beginning adjacent cells A, B, D, E, and F, and entirely new cells, such as cell C. This addition of these new cell portions is a consequence of moving surface 36 moving in an expansion direction 38 relative to beginning adjacent cells A, B, D, E, and F. Thus, grid 32 is reformed to a new grid, designated 32', to include new cell portions 40, 42, and 44 of cell A; new portions 46 and 48 of cell B; new portion 50 of cell D; new portions 52, 54, and 56 of cell E; new portion 58 of cell F; and new cell C comprising portions 80 and 82. As used herein, "new cell portions" can include portions of an entirely new cell.

As further embodied herein, the method includes initializing the newly added cell portions with appropriate thermophysical values. In the expansion case depicted in FIGS. 1A and 1B, the appropriate values may be volume-weighted averages of the thermophysical values of the respective beginning adjacent cell, if any, and the values of the swept volumes intersected by that cell, all values being the end-of-time step $\Delta \tau$ values. For example, the new values for cell B are volume weighted averages of volume portion 84 (using end-of-time step values for cell B), volume portion 46 (using end-of-time step values for boundary 62 of cell B), and volume portion 48 (using end-of-time step values for boundary 64 of cell D). The values for new cell C would be volume-weighted averages of volume portion 80 (using end-of-time step values for boundary 62 of cell B) and of volume portion 82 (using end-of-time step values for boundary 64 of cell D). Note that both the volume and the thermophysical values for a "respective beginning adjacent cell" corresponding to cell C would be zero in the initialization calculation because cell C was created by the movement of the surface, and thus has no "respective beginning adjacent cell." However, non-zero end-of-time step $\Delta \tau$ values would exist for the initialization of cell C due to the contributions from the swept volumes from cells B and D, as detailed above. The use of volume-weighted thermophysical values in the disclosed method ensures conservation of these values, because the amounts originally "fluxed out" through the beginning cell boundaries are recaptured in the initialization step.

Figure 2A:
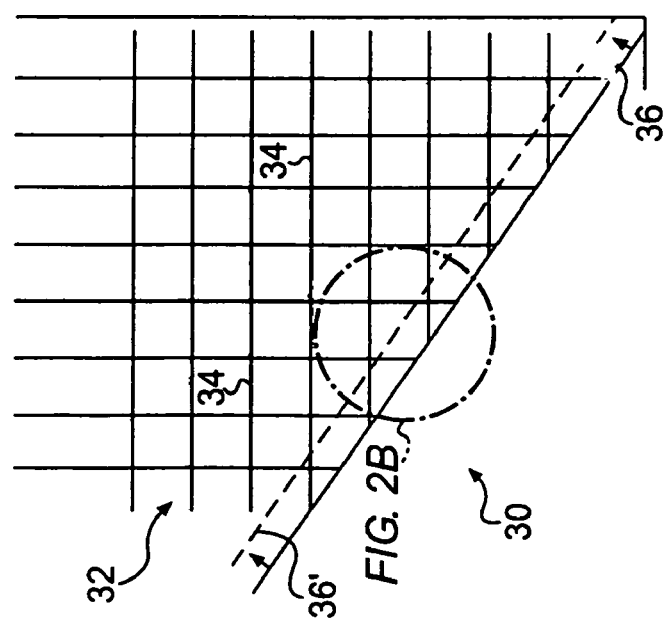
FIG. 2A is a schematic illustration of an exemplary boundary surface of a fluid dynamic system model moving in a "compression" sense in relation to the fixed geometric model grid, to be treated in accordance with the present invention.

Referring now to FIGS. 2A and 2B, treatment of a surface moving in a "compression" sense with respect to multi-cell model 30 will now be discussed. As shown in FIG. 2A, moving surface 36 moves into the fixed grid 32 in model 30 to a new position 36' during a transient time step $\Delta\tau$. In the general case, a compressive movement of surface 36 may obscure all or part of the cells 34 that were adjacent to moving surface 36 at the beginning of time step $\Delta\tau$, that is, the cells having a boundary formed by surface 36 at the beginning of time step $\Delta\tau$.

As embodied herein and as best shown in FIG. 2B, model cells U, W, X, and Z would be identified as beginning adjacent cells in the identifying step of the disclosed method, and respective beginning cell boundaries 102, 104, 106, and 108 would be "beginning cell boundaries," being coincident with the moving surface 36 at the beginning of the time step. Again, as in the "expansion" case depicted in FIGS. 1A and 1B, not all of the possible beginning adjacent cells are shown in the 2D representations of FIGS. 2A and 2B but would be included in the performance of the disclosed method on a 3D grid.

As further embodied herein, the step of computing effective inflow fluxes through the beginning cell boundaries for a surface moving in a "compression" sense may include setting a flux velocity based on the velocity of the moving surface. In the embodiment in FIGS. 2A and 2B, the velocity of surface 36 moving to position 36' in time step $\Delta\tau$ would be determined for each of the identified beginning cell boundaries, such as boundaries 102 of cell U; 104 of cell W; 106 of cell X; and 108 of cell Z.

As embodied herein, for the case of a surface moving in a "compression" sense the effective flux computing step of the disclosed method may also include determining volumes swept by the respective beginning cell boundary projected to a position of the moving surface at the end of the time step. In FIG. 2B, the swept volumes are depicted (in 2D) by the rectangular dotted areas adjacent the beginning boundaries. Note that in the "compression" case the swept volumes will intersect a portion of the grid existing at the beginning of the time step. For instance, in FIG. 2B, the volume swept by projected beginning boundary 106 of cell X intersects volume portion 126 of cell X; portion 118 of cell W; portion 134 of cell Y; and portion 120 of cell Z. In comparison, the volume swept by projected boundary 104 of cell W only intersects volume portion 116 of that same cell, in the 2D representation of FIG. 2B. One skilled in the art would understand that in a 3D compression case, the volumes swept by beginning boundaries 106 and 104 may intersect other cell portions (not shown) out of the plane of FIG. 2B.

As embodied herein, the disclosed method may further include calculating a set of thermophysical values to be applied at the moving boundary as inflow fluxes to be coupled with the effective boundary velocity. These values are computed s a volume-weighted average of the thermophysical values of the cell portions that will be intersected by the respective beginning cell boundaries during the timestep. Hence, the selected inflow flux values to be applied at boundary 106 may be a volume weighted-average of the cell portions that will be swept by boundary 106 during the timestep, namely, volume portions 126, 118, 134, and 120 in FIG. 2B, for that 2D representation.

As still further embodied herein, the solving transport equations step of the disclosed method for the expansion case of FIGS. 2A and 2B is accomplished in the same manner as the previously discussed expansion case except that the flux through the beginning cell boundaries is an assumed flow of the selected thermophysical values into the respective beginning boundary cells of the grid, namely, grid 32 in FIG. 2A. Specifically, the equations governing transport of thermophysical properties between cell X and neighboring cells W and Z would be solved, together with the assumed incoming flux through boundary 106, for determining the updated thermophysical values for cell X. Even though cell X will eventually be deleted in the grid reforming step, the effect of the value influx through boundary 106 will directly influence the updated state values calculated for cells W and Z, and indirectly other cells such as cell Y and others, as the transport equations for these cells are solved.

Again, as in the expansion discussed above, successive iterations of the computing and solving steps of the method may be employed to provide convergence to a preselected degree. Also, updated values of the effective fluxes and thermophysical values from the immediately preceding iterations may be used in the successive iterations. And, the transport equations for all the cells in the grid can be solved, particularly if the effect of the moving surface is expected to propagate across the entire grid to a meaningful degree.

As further embodied herein, and with continued reference to FIG. 2B, new moving surface position 36' results in grid 32 being reformed to delete volume portions 110 and 112 of adjacent cell U; portions 114, 116, and 118 of cell W; and portions 120, 122, and 124 of cell Z, as well as the entire volume 126 of adjacent cell X. Reforming the grid 32 also includes deleting volume portions 130 and 132 of neighboring cell V and portion 134 of neighboring cell Y. With these cell portions being deleted from grid 32 in the reforming step, the thermophysical values associated with these volume portions are also deleted, thus conserving the value amounts fluxed through the respective beginning cell boundaries into the beginning adjacent cells in accordance with the computing step discussed above.

INDUSTRIAL APPLICABILITY

The foregoing method for treating moving boundaries in multi-cell computer models of fluid dynamic systems can be readily implemented to assess performance in a variety of industrial applications. For example, FIG. 3A is a schematic sectional representation of intake pipe 214 having a movable throttle plate 216, for use in an internal combustion engine (not shown). FIG. 3B is a detail of FIG. 3A and schematically shows a superimposed fixed underlying geometric grid 218 representing a model array of three-dimensional computational cells 220, 222, and 226 for predicting performance (flow, pressure, temperature, etc.) in intake pipe 214 for various operating conditions corresponding to movement and/or positioning of throttle plate 216. Cells 220, 222, and 226 as depicted are geometrically regular (cubic), except at the system boundaries, and can be described using a Cartesian coordinate system. Model grid 118 can utilize cells of different size, including larger cells 220 that make up the bulk of the model as well as smaller size, "embedded" grid cells 222 and 226 that are located in the regions of expected sharp gradients in gas pressure, velocity, and/or temperature, such as in the immediate vicinity of throttle plate 216. The above-described method would be particularly useful in treating the moving surface boundaries in grid 218 caused by rotation of throttle plate 216.

Figure 4:
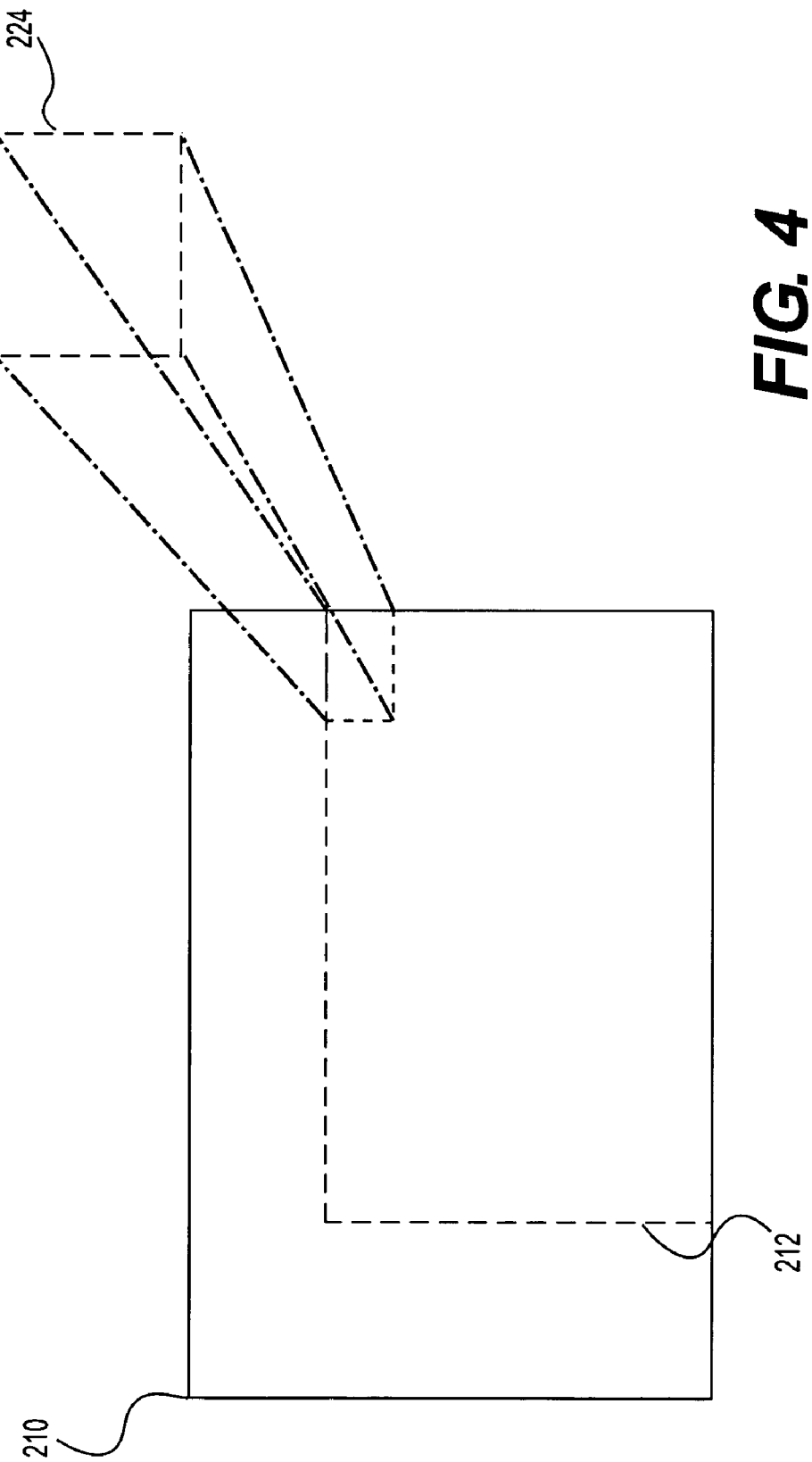
FIG. 4 is a schematic illustration of exemplary apparatus for carrying out the disclosed method of the present invention.

In accordance with another aspect, an apparatus for implementing a multi-cell computational fluid dynamics model having a moving surface during a transient condition includes a digital computer and a computation fluid dynamics program loaded in the computer for running a multi-cell model having a fixed underlying geometric grid. As embodied herein, FIG. 4 schematically depicts programmable digital computer 210 having a computational fluid dynamics program 212, such as the MoSES program modified to implement the previously described method. Specifically, program 212 can be configured to run the 3D multi-cell model of intake pipe 214 as represented by grid 218.

As further embodied herein, program 212 includes program routine 224 having software for implementing the above-disclosed method for treating boundaries associated with moving. Specifically, routine 224 includes software for identifying beginning adjacent cells in the grid and respective beginning cell boundaries corresponding to the moving surfaces of throttle plate 216 at the beginning of a transient time step; computing effective thermophysical value fluxes through the respective beginning cell boundaries; solving the transport equations to determine thermophysical values for the cells 220, 222, and 226 at the end of the time step, and reforming grid 218 to comply with the moving surfaces of throttle plate 216 at the end of the time step. Note that for clockwise rotation, throttle plate 216 has surfaces 230 and 232 that move in a "compression" sense with respect to adjacent cells 226, as well as surfaces 234 and 236 that move in an "expansion" sense relative to the adjacent cells 222.

Those skilled in the art of computer simulation of transient conditions would understand that, in general, the magnitude of the individual transient time step as well as the grid size of the cells would be selected based on the particular application and the severity of the transient. Also, those skilled in the art of programming digital computers to run fluid dynamic computation could provide the necessary software to implement the disclosed method given the present disclosure.

It may be preferred that the method and apparatus of the present invention be used in conjunction with the Method and Apparatus for Implementing Multi-Grid Computation for Multi-Cell Computer Models with Embedded Cells disclosed in U.S. Ser. No. 11/318,634 filed Dec. 28, 2005.

It may also be preferred that the method and apparatus of the present invention be used in conjunction with the Method and Apparatus for Solving Transport Equations in Multi-Cell Computer Models of Dynamic Systems disclosed in U.S. Ser. No. 11/318,632 filed Dec. 28, 2005.

It may still also be preferred that the method and apparatus of the present invention be used in conjunction with the Method and Apparatus for Automated Grid Formation in Multi-Cell System Dynamics Models disclosed in U.S. Ser. No. 11/318,631 filed Dec. 28, 2005.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. Method for implementing a multi-cell computational fluid dynamics model having a moving surface during a transient condition, the model having a fixed underlying geometric grid defining model cells, the method being executed in a digital computer, the method comprising:

loading the model into the digital computer;

identifying as beginning adjacent cells the model cells in the grid adjacent the moving surface at the beginning of a transient time step, wherein identifying beginning adjacent cells includes identifying beginning adjacent cell boundaries formed in the grid by the moving surface;

computing effective thermophysical value fluxes through the beginning adjacent cell boundaries in accordance with the sense of the movement of the moving surface relative to the beginning adjacent cells, wherein the computing step includes determining respective swept volumes swept by each beginning adjacent cell boundary projected to a position of the moving surface at the end of the time step;

solving transport equations for all the cells in at least the portion of the grid including the beginning adjacent cells to determine cell thermophysical values at the end of the time step, using the computed effective fluxes; and reforming the grid to add or delete model cell portions based on the respective swept volumes, to comply with the moving surface at the end of the time step.

2. The method as in claim 1, wherein the moving surface is moving in a compression sense relative to the beginning adjacent cells; and wherein the effective thermophysical value fluxes are fluxes into the respective beginning adjacent cells.

3. The method as in claim 1, wherein the moving surface is moving in an expansion sense relative to the beginning adjacent cells; and wherein the effective thermophysical value fluxes are fluxes out of the respective beginning adjacent cells.

4. The method in claim 1, wherein the computing step further includes, for each beginning adjacent boundary cell:

setting a flux velocity based on a velocity of the moving surface in a direction normal to the respective beginning adjacent cell boundary; and selecting thermophysical values for the respective swept volume for combining with the set flux velocity.

5. The method as in claim 1, wherein the computing and solving steps are iteratively repeated until a convergence criterion is met.

6. The method as in claim 5, wherein the computed effective fluxes used in the repeated steps are based on the latest solved thermophysical values of the cells at the end of the time step.

7. The method as in claim 4, wherein the surface is moving in a compression sense relative to the beginning adjacent cells; and wherein the selected thermophysical values corresponding to each respective swept volume are an average of the thermophysical values of beginning adjacent boundary cells intersected by the respective swept volume.

8. The method as in claim 4, wherein the surface is moving in an expansion sense relative to the beginning adjacent cells; and wherein the selected thermophysical values corresponding to each respective swept volume are the thermophysical values of the respective beginning adjacent cells.

9. The method as in claim 1, wherein the moving surface is moving in an expansion sense relative to the beginning adjacent cells; and wherein the step of reforming the grid at the end of the time step further includes:

adding new model cell portions commensurate with the respective swept volumes; and initializing each new model cell portion with an average of the thermophysical values of the respective swept volumes comprising the respective new cell portion.

10. The method as in claim 1,
wherein the moving surface is moving in a compression sense relative to the beginning adjacent cells; and
wherein the step of reforming the grid includes deleting from the model cells all swept volume portions and associated thermophysical values.

11. Apparatus for implementing a fixed geometric grid multi-cell computational fluid dynamics model having a moving surface during a transient condition, the apparatus comprising:
a digital computer;
a program loaded in the computer for running the multi-cell computational fluid dynamics model, the fixed geometric grid defining model cells, wherein the program includes software for:
identifying as beginning adjacent cells the model cells in the grid adjacent the moving surface at the beginning of a transient time step, wherein identifying beginning adjacent cells includes identifying beginning adjacent cell boundaries formed in the grid by the moving surface;
computing effective thermophysical value fluxes through the beginning adjacent cell boundaries in accordance with the sense of the movement of the moving surface relative to the beginning adjacent cells,
wherein the software for computing includes software for determining respective swept volumes swept by each beginning adjacent cell boundary projected to a position of the moving surface at the end of the time step;
solving transport equations for all the model cells in at least a portion of the grid including the beginning adjacent cells to determine model cell thermophysical values at the end of the time step, using the computed effective fluxes; and
reforming the grid to add or delete model cell portions based on the respective swept volumes, to comply with the moving surface at the end of the time step.

12. The apparatus as in claim 11,
wherein the moving surface is moving in a compression sense relative to the beginning adjacent cells; and
wherein the effective thermophysical value fluxes are fluxes into the respective beginning adjacent cells.

13. The apparatus as in claim 11,
wherein the moving surface is moving in an expansion sense relative to the beginning adjacent cells; and
wherein the effective thermophysical value fluxes are fluxes out of the respective beginning adjacent cells.

14. The apparatus in claim 11, wherein the program further includes software for, for each beginning adjacent boundary cell:
setting a flux velocity based on a velocity of the moving surface; and
selecting thermophysical values for the respective swept volume for combining with the set flux velocity.

15. The apparatus as in claim 11, wherein the program further includes software for iteratively repeating the computing and solving steps until a convergence criterion is met.

16. The apparatus as in claim 15, wherein the computed effective fluxes used in the repeated steps are based on the latest solved thermophysical values of the model cells at the end of the time step.

17. The apparatus as in claim 14,
wherein the surface is moving in a compression sense relative to the beginning adjacent cells; and
wherein the selected thermophysical values corresponding to each beginning cell boundary respective swept volume are an average of the thermophysical values of model cells intersected by the respective swept volume during the timestep.

18. The apparatus as in claim 14,
wherein the surface is moving in an expansion sense relative to the beginning adjacent cells; and
wherein the selected thermophysical values of the respective swept volumes are the thermophysical values of the respective beginning adjacent cells.

19. The apparatus as in claim 11,
wherein the moving surface is moving in an expansion sense relative to the beginning adjacent cells; and
wherein the software for reforming the grid at the end of the time step further includes software for:
adding new model cell volume portions commensurate with the swept volumes; and
initializing each new model cell portion in the reformed grid intersected by the respective swept volumes with a volume-weighted average of the thermophysical values of the respective beginning adjacent cell and the thermophysical values of the respective swept volumes intersected by that model cell portion, said respective beginning cell values and said intersected respective swept volume values being those at the end of the transient time step.

20. The apparatus as in claim 11,
wherein the moving surface is moving in a compression sense relative to the beginning adjacent cells; and
wherein for the step of reforming the grid, the program further includes software for deleting from the model cells all respective swept volume portions and associated thermophysical values.

* * * * *